US008554560B2

(12) United States Patent
Valsan

(10) Patent No.: US 8,554,560 B2
(45) **Date of Patent: *Oct. 8, 2013**

(54) VOICE ACTIVITY DETECTION

(75) Inventor: Zica Valsan, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,390

(22) Filed: Sep. 4, 2012

(65) Prior Publication Data

US 2012/0330656 A1 Dec. 27, 2012

Related U.S. Application Data

(63) Continuation of application No. 12/515,048, filed as application No. PCT/EP2007/061534 on Oct. 26, 2007, now Pat. No. 8,311,813.

(30) Foreign Application Priority Data

Nov. 16, 2006 (EP) .................................... 06124228

(51) Int. Cl.
*G10L 15/00* (2013.01)

(52) U.S. Cl.
USPC ........... 704/238; 704/210; 704/213; 704/214; 704/215

(58) Field of Classification Search
USPC .......................... 704/238, 213, 214, 215, 210
See application file for complete search history.

(56) References Cited

U.S. PATENT DOCUMENTS

| | | | | |
|---|---|---|---|---|
| 4,696,039 | A | 9/1987 | Doddington | |
| 4,780,906 | A | 10/1988 | Rajasekaran et al. | |
| 5,794,195 | A * | 8/1998 | Hormann et al. | 704/253 |
| 6,314,396 | B1 | 11/2001 | Monkowski | |
| 6,556,967 | B1 | 4/2003 | Nelson et al. | |
| 6,615,170 | B1 * | 9/2003 | Liu et al. | 704/233 |
| 8,131,543 | B1 * | 3/2012 | Weiss et al. | 704/233 |
| 2006/0053007 | A1 | 3/2006 | Niemisto | |
| 2006/0178877 | A1 | 8/2006 | Jiang et al. | |
| 2006/0224382 | A1 | 10/2006 | Taneda | |
| 2007/0033042 | A1 | 2/2007 | Marcheret et al. | |

(Continued)

FOREIGN PATENT DOCUMENTS

| | | |
|---|---|---|
| AU | 697062 | 1/1996 |
| JP | 2001-343983 | 12/2001 |

OTHER PUBLICATIONS

Cohn et al. "Semi-supervised Clustering with User Feedback" 2000.*

(Continued)

*Primary Examiner* — Greg Borsetti
(74) *Attorney, Agent, or Firm* — Thomas E. Lees, LLC

(57) ABSTRACT

Discrimination between two classes comprises receiving a set of frames including an input signal and determining at least two different feature vectors for each of the frames. Discrimination between two classes further comprises classifying the two different feature vectors using sets of preclassifiers trained for at least two classes of events and from that classification, and determining values for at least one weighting factor. Discrimination between two classes still further comprises calculating a combined feature vector for each of the received frames by applying the weighting factor to the feature vectors and classifying the combined feature vector for each of the frames by using a set of classifiers trained for at least two classes of events.

15 Claims, 4 Drawing Sheets

(56) References Cited

U.S. PATENT DOCUMENTS

| | | | | |
|---|---|---|---|---|
| 2007/0036342 | A1 | 2/2007 | Boillot et al. | |
| 2008/0010065 | A1 | 1/2008 | Bratt et al. | |
| 2008/0300875 | A1 * | 12/2008 | Yao et al. | 704/236 |
| 2009/0076814 | A1 | 3/2009 | Lee | |

OTHER PUBLICATIONS

Marcheret et al. "Speech Activity Detection Fusing Acoustic Phonetic and Energy Features" 2005.*

Kida et al. "Voice Activity Detection based on OptimallyWeighted Combination of Multiple Features" 2005.*

Li, Q., et al., "A Robust, Real-Time Endpoint Detector with Energy Normalization for ASR in Adverse Environments," Multimedia Communications Research Laboratory, Bell Labs, Lucent Technologies, Murray Hill, NJ, IEEE, Proc. ICASSP, 2001, pp. 233-236.

Rabiner, L., et al., "Application of an LPC Distance Measure to the Voiced-Unvoiced-Silence Detection Problem", IEEE Transactions on Acoustics, Speech, and Signal Processing, Aug. 1977, vol. ASSP-25, No. 4, pp. 338-343.

Martin, A., et al., "Robust Speech/Nonspeech Detection Using LDA Applied to MFCC", France Telecom R&D, France, IEEE, Proc. ICASSP, 2001, pp. 237-240.

Lu, L., et al., "Content Analysis for Audio Classification and Segmentation", IEEE Transactions on Speech & Audio Processing, Oct. 2002, vol. 10, No. 7, pp. 504-516.

Ajmera, J., et al., "Speech/Music Discrimination Using Entropy and Dynamism Features in a HMM Classification Framework", IDIAP, IDIAP-RR 01-26, Aug. 2001, Martigny, Switzerland.

Hain, T., et al., "Segment Generation and Clustering in the HTK Broadcast News Transcription System", Speech, Vision and Robotics Group, Cambridge University Engineering Department, Cambridge, UK, 1998, DARPA Broadcast News Transcription and Understanding Workshop, pp. 133-137.

Palou, F., et al., "Towards a Common Phone Alphabet for Multilingual Speech Recognition", IBM Voice Systems, European Speech Research, 6th International Conference on Spoken Language Processing (ICSLP 2000), Oct. 16-20, 2000, Beijing, China.

Fischer, V., et al., "Towards Multilingual Acoustic Modeling for Large Vocabulary Continuous Speech Recognition", IBM Voice Systems, European Speech Research, Heidelberg, F.R. of Germany, in Proc. of the IEEE Workshop on Multilingual Speech Communications, 2000, Kyoto, Japan.

Kunzmann, S., et al., "Multilingual Acoustic Models for Speech Recognition and Synthesis", IBM Pervasive Computing, European Voice Technology Development, Mannheim, Germany, IEEE, ICASSP, in Proc. of the IEEE International Conference on Acoustics, Speech, and Signal Processing, 2004, pp. III-745 to III-748, Montreal.

Yamamoto et al., "Robust Endpoint Detection for Speech Recognition Based on Discriminative Feature Extraction", May 14-19, 2006.

H. Matsuda et al., "Voice Activity Detection with 3rd Order Cumulant," IEICE technical report, Sep. 19, 2006, vol. 106, No. 263, pp. 37-42.

Teissier, et al., "Comparing Models for Audiovisual Fusion in a Noisy-Vowel Recognition Task", IEEE Transactions on Speech and Audio Processing, IEEE Service Center, New York, NY. US. vol. 7 No. 6, Nov. 1999, XP011054413 ISSN: 1063-6676.

Wang et al. "Feature extraction and dimensionality reduction algorithms and their applications in vowel recognition", 2003, Pattern Recognition 36.

Chang, et al., A Statistical Model-Based V/UV Decision under Background Noise Environment, IEICE Trans. Inf. & Syst., vol. E87-D, No. 12, pp. 2885-2887 (Dec. 2004).

Sohn, et al., "A Stastical Model-Based Voice Activity Detection", IEEE Signal Processing Letters, vol. 6, No. 1 , pp. 1-3 (Jan. 1999).

Shin et al. "Speech/Non-Speech Classification Using Multiple Features for Robust Endpoint Detection", 2000.

Gorriz et al., "Independent Component Analysis Applied to Voice Activity Detection", May 28-31, 2006.

Marcheret et al. "The IBM RTO6s Evaluation System for Speech Activity Detection in CHIL Seminars", May 1-4, 2006.

Notification of Transmittal of the International Preliminary Report on Patentability for PCT Application No. PCT/EP2007/061534, mailing date of Jan. 23, 2009, European Patent Office, Munich, Germany.

Written Opinion of the International Preliminary Examining Authority for PCT Application No. PCT/EP2007/061534, mailing date of Sep. 17, 2008, European Patent Office, Munich, Germany.

Notification of Transmittal of the International Search Report and the Written Opinion of the International Searching Authority for PCT Application No. PCT/EP2007/061534, mailing date of Jan. 21, 2008, European Patent Office, Rijswijk, Netherlands.

* cited by examiner

VOICE ACTIVITY DETECTION

CROSS REFERENCE TO RELATED APPLICATIONS

This application is a continuation of U.S. Pat. No. 8,311,813, entitled VOICE ACTIVITY DETECTION SYSTEM AND METHOD, filed May 15, 2009, which was a §371 of PCT/EP07/61534, entitled VOICE ACTIVITY DETECTION SYSTEM AND METHOD, filed Oct. 26, 2007, which claims the benefit of European patent application no. 06124228.5, entitled VOICE ACTIVITY DETECTION SYSTEM AND METHOD, filed Nov. 16, 2006, the entire disclosures of which are incorporated by reference herein.

BACKGROUND OF THE INVENTION

1. Field of the Invention

The present invention relates in general to voice activity detection. In particular, but not exclusively, the present invention relates to discriminating between event types, such as speech and noise.

2. Related Art

Voice activity detection (VAD) is an essential part in many speech processing tasks such as speech coding, hands-free telephony and speech recognition. For example, in mobile communication the transmission bandwidth over the wireless interface is considerably reduced when the mobile device detects the absence of speech. A second example is automatic speech recognition system (ASR). VAD is important in ASR, because of restrictions regarding memory and accuracy. Inaccurate detection of the speech boundaries causes serious problems such as degradation of recognition performance and deterioration of speech quality.

VAD has attracted significant interest in speech recognition. In general, two major approaches are used for designing such a system: threshold comparison techniques and model based techniques. For the threshold comparison approach, a variety of features like, for example, energy, zero crossing, autocorrelations coefficients, etc. are extracted from the input signal and then compared against some thresholds. Some approaches can be found in the following publications: Li, Q., Zheng, J., Zhou, Q., and Lee, C.-H., "A robust, real-time endpoint detector with energy normalization for ASR in adverse environments," *Proc. ICASSP*, pp. 233-236, 2001; L. R. Rabiner, et al., "Application of an LPC Distance Measure to the Voiced-Unvoiced-Silence Detection Problem," *IEEE Trans. On ASSP*, vol. ASSP-25, no. 4, pp. 338-343, August 1977.

The thresholds are usually estimated from noise-only and updated dynamically. By using adaptive thresholds or appropriate filtering their performance can be improved. See, for example, Martin, A., Charlet, D., and Mauuary, L, "Robust Speech/Nonspeech Detection Using LDA applied to MFCC," *Proc. ICASSP*, pp. 237-240, 2001; Monkowski, M., *Automatic Gain Control in a Speech Recognition System*, U.S. Pat. No. 6,314,396; and Lie Lu, Hong-Jiang Zhang, H. Jiang, "Content Analysis for Audio Classification and Segmentation," *IEEE Trans. Speech & Audio Processing, Vol.* 10, NO. 7, pp. 504-516, October 2002.

Alternatively, model based VAD were widely introduced to reliably distinguish speech from other complex environment sounds. Some approaches can be found in the following publications: J. Ajmera, I. McCowan, "Speech/Music Discrimination Using Entropy and Dynamism Features in a HMM Classification Framework," *IDIAP-RR* 01-26, *IDIAP*, Martigny, Switzerland 2001; and T. Hain, S. Johnson, A. Tuerk, P. Woodland, S. Young, "Segment Generation and Clustering in the HTK Broadcast News Transcription System", *DARPA Broadcast News Transcription and Understanding Workshop*, pp. 133-137, 1998. Features such us full band energy, sub-band energy, linear prediction residual energy or frequency based features like Mel Frequency Cepstral Coefficients (MFCC) are usually employed in such systems.

Threshold adaptation and energy features based VAD techniques fail to handle complex acoustic situations encountered in many real life applications where the signal energy level is usually highly dynamic and background sounds such as music and non-stationary noise are common. As a consequence, noise events are often recognized as words causing insertion errors while speech events corrupted by the neighboring noise events cause substitution errors. Model based VAD techniques work better in noisy conditions, but their dependency on one single language (since they encode phoneme level information) reduces their functionality considerably.

The environment type plays an important role in VAD accuracy. For instance, in a car environment where high signal-to-noise ratio (SNR) conditions are commonly encountered when the car is stationary an accurate detection is possible. Voice activity detection remains a challenging problem when the SNR is very low and it is common to have high intensity semi-stationary background noise from the car engine and high transient noises such as road bumps, wiper noise, door slams. Also in other situations, where the SNR is low and there is background noise and high transient noises, voice activity detection is challenging.

It is therefore highly desirable to develop a VAD method/system which performs well for various environments and where robustness and accuracy are important considerations.

SUMMARY OF INVENTION

According to various aspects of the present invention, discriminating between at least two classes of events comprises receiving a set of frames including an input signal and determining at least two different feature vectors for each of the frames. Discriminating between at least two classes of events further comprises classifying the two different feature vectors using sets of preclassifiers trained for at least two classes of events and from that classification, and determining values for at least one weighting factor. Further, discriminating between at least two classes of events comprises calculating a combined feature vector for each of the received frames by applying the weighting factor to the feature vectors and classifying the combined feature vector for each of the frames by using a set of classifiers trained for at least two classes of events.

According to further aspects of the present invention, a method for training a voice activity detection system is disclosed. The method includes receiving a set of frames containing a training signal and determining a quality factor for each of the frames. The method further includes labeling the frames into at least two classes of events based on the content of the training signal and determining at least two different feature vectors for each of the frames. Moreover, the method includes training respective sets of preclassifiers to classify the at least two different feature vectors using for at least two classes of events and determining values for at least one weighting factor based on outputs of the preclassifiers for each of the frames. Also, the method includes calculating a combined feature vector for each of the frames by applying the at least one weighting factor to the at least two different feature vectors and classifying the combined feature vector using a set of classifiers to classify the combined feature vector into the at least two classes of events.

BRIEF DESCRIPTION OF FIGURES

For a better understanding of the present invention and as how the same may be carried into effect, reference will now be made by way of example only to the accompanying drawings in which.

DETAILED DESCRIPTION OF PREFERRED EMBODIMENTS OF THE INVENTION

Figure 1:
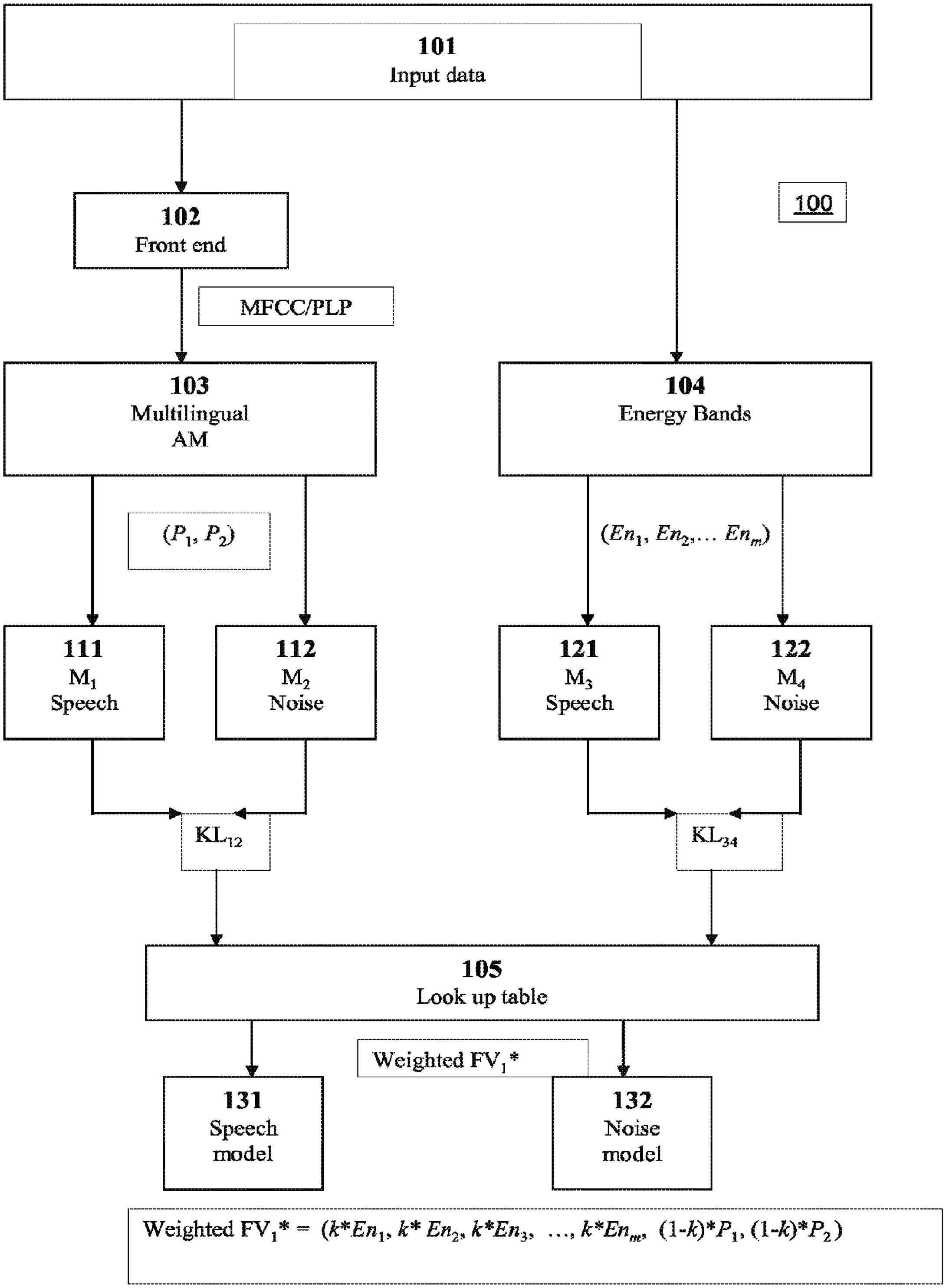
FIG. 1 shows schematically, as an example, a voice activity detection system in accordance with an embodiment of the invention.

Embodiments of the present invention combine a model based voice activity detection technique with a voice activity detection technique based on signal energy on different frequency bands. This combination provides robustness to environmental changes, since information provided by signal energy in different energy bands and by an acoustic model complements each other. The two types of feature vectors obtained from the signal energy and acoustic model follow the environmental changes. Furthermore, the voice activity detection technique presented here uses a dynamic weighting factor, which reflects the environment associated with the input signal. By combining the two types of feature vectors with such a dynamic weighting factor, the voice activity detection technique adapts to the environment changes.

Although feature vectors based on acoustic model and energy in different frequency bands are discussed in detail below as a concrete example, any other feature vector types may be used, as long as the feature vector types are different from each other and they provide complement information on the input signal.

A simple and effective feature for speech detection in high SNR conditions is signal energy. Any robust mechanism based on energy must adapt to the relative signal and noise levels and the overall gain of the signal. Moreover, since the information conveyed in different frequency bands is different depending on the type of phonemes (sonorant, fricatives, glides, etc), energy bands are used to compute these features type. A feature vector with m components can be written like ($En_1$, $En_2$, $En_3$, . . . , $En_m$), where m represents the number of bands. A feature vector based on signal energy is the first type of feature vectors used in voice activity detection systems in accordance with embodiments of the present invention. Other feature vector types based on energy are spectral amplitude, such as log energy and speech energy contour. In principle, any feature vector which is sensitive to noise can be used.

Frequency based speech features, like mel frequency cepstral coefficients (MFCC) and their derivatives, Perceptual Linear Predictive coefficients (PLP), are known to be very effective to achieve improved robustness to noise in speech recognition systems. Unfortunately, they are not so effective for discriminating speech from other environmental sounds when they are directly used in a VAD system. Therefore a way of employing them in a VAD system is through an acoustic model (AM).

When an acoustic model is used, the functionality of the VAD typically limited only to that language for which the AM has been trained. The use of a feature based VAD for another language may require a new AM and re-training of the whole VAD system at increased cost of computation. It is thus advantageous to use an AM trained on a common phonology which is able to handle more than one language. This minimizes the effort at a low cost of accuracy.

A multilingual AM requires speech transcription based on a common alphabet across all the languages. To reach a common alphabet one can start from the previous existing alphabets for each of the involved languages where some of them need to be simplify and then to merge phones present in several languages that correspond to the same IPA symbol. This approach is discussed in F. Palou Cambra, P. Bravetti, O. Emam, V. Fischer, and E. Janke, "Towards a common alphabet for multilingual speech recognition," in *Proc. of the 6th Int. Conf on Spoken Language Processing*, Beijing, 2000. Acoustic modelling for multilingual speech recognition to a large extend makes use of well established methods for (semi-) continuous Hidden-Markov-Model training, but a neural network which will produce the posterior class probability for each class can also be taken into consideration for this task. This approach is discussed in V. Fischer, J. Gonzalez, E. Janke, M. Villani, and C. Waast-Richard, "Towards Multilingual Acoustic Modeling for Large Vocabulary Continuous Speech Recognition," in *Proc. of the IEEE Workshop on Multilingual Speech Communications*, Kyoto, Japan, 2000; S. Kunzmann, V. Fischer, J. Gonzalez, O. Emam, C. Gunther, and E. Janke, "Multilingual Acoustic Models for Speech Recognition and Synthesis," in *Proc. of the IEEE Int. Conference on Acoustics, Speech, and Signal Processing*, Montreal, 2004.

Assuming that both speech and noise observations can be characterized by individual distributions of Gaussian mixture density functions, a VAD system can also benefit from an existing speech recognition system where the statistic AM is modeled as a Gaussian Model Mixtures (GMM) within the hidden Markov model framework. An example can be found in "E. Marcheret, K. Visweswariah, G. Potamianos, "Speech Activity Detection fusing Acoustic Phonetic and Energy Features," *Proc./ICASLP* 2005. Each class is modeled by a GMM (with a chosen number of mixtures). The class posterior probabilities for speech/noise events are computed on a frame basis and called within this invention as ($P_1$, $P_2$). They represent the second type of feature vector (FV).

In the following description, a multilingual acoustic model is often used as an example of a model providing feature vectors. It is appreciated that it is straightforward to derive a monolingual acoustic model from a multilingual acoustic model. Furthermore, it is possible to use a specific monolingual acoustic model in a voice detection system in accordance with an embodiment of the invention.

The first feature vectors ($En_1$, $En_2$, $En_3$, . . . , $En_m$) relating to the energy of frequency bands are input to a first set of preclassifiers. The second feature vectors, for example ($P_1$, $P_2$) for the two event types, provided by an acoustic model or other relevant model are input into a second set of preclassifiers. The pre-classifiers are typically Gaussian mixture preclassifiers, outputting Gaussian mixture distributions. For any of the Gaussian Mixture Models employed in embodiments of this invention, one can use for instance neural networks to estimate the posterior probabilities of each of the classes.

The number of pre-classifiers in these sets corresponds with the number of event classes the voice activity detection system needs to detect. Typically, there are two event classes: speech and non-speech (or, in other words, speech and noise). But depending on the application, there may be need for a larger number of event classes. A quite common example is to have the following three event classes: speech, noise and silence. The pre-classifiers have been trained for the respective event classes. Training is discussed in some detail below.

At high SNR (clean environment), the distributions of the two classes are well separated and any of the pre-classifiers associated with the energy based models will provide a reliable output. It is also expected that the classification models associated with the (multilingual) acoustic model will provide a reasonably good class separation. At low SNR (noisy environment), the distributions of the two classes associated with the energy bands overlap considerably making questionable the decision based on the pre-classifiers associated with energy bands alone.

It seems that one of the FV type is more effective than the other depending on the environment type (noisy or clean). But in real applications changes in environment occur very often requiring the presence of both FV types in order to increase the robustness of the voice activity detection system to these changes. Therefore a scheme where the two FV types are weighted dynamically depending on the type of the environment will be used in embodiments of the invention.

There remains the problem of defining the environment in order to decide which of the FV will provide the most reliable decision. A simple and effective way of inferring the type of the environment involves computing distances between the event type distributions, for example between the speech/noise distributions. Highly discriminative feature vectors which provide better discriminative classes and lead to large distances between the distributions are emphasized against the feature vectors which no dot differentiate between the distributions so well. Based on the distances between the models of the pre-classifiers, a value for the weighting factor is determined.

Figure 2:
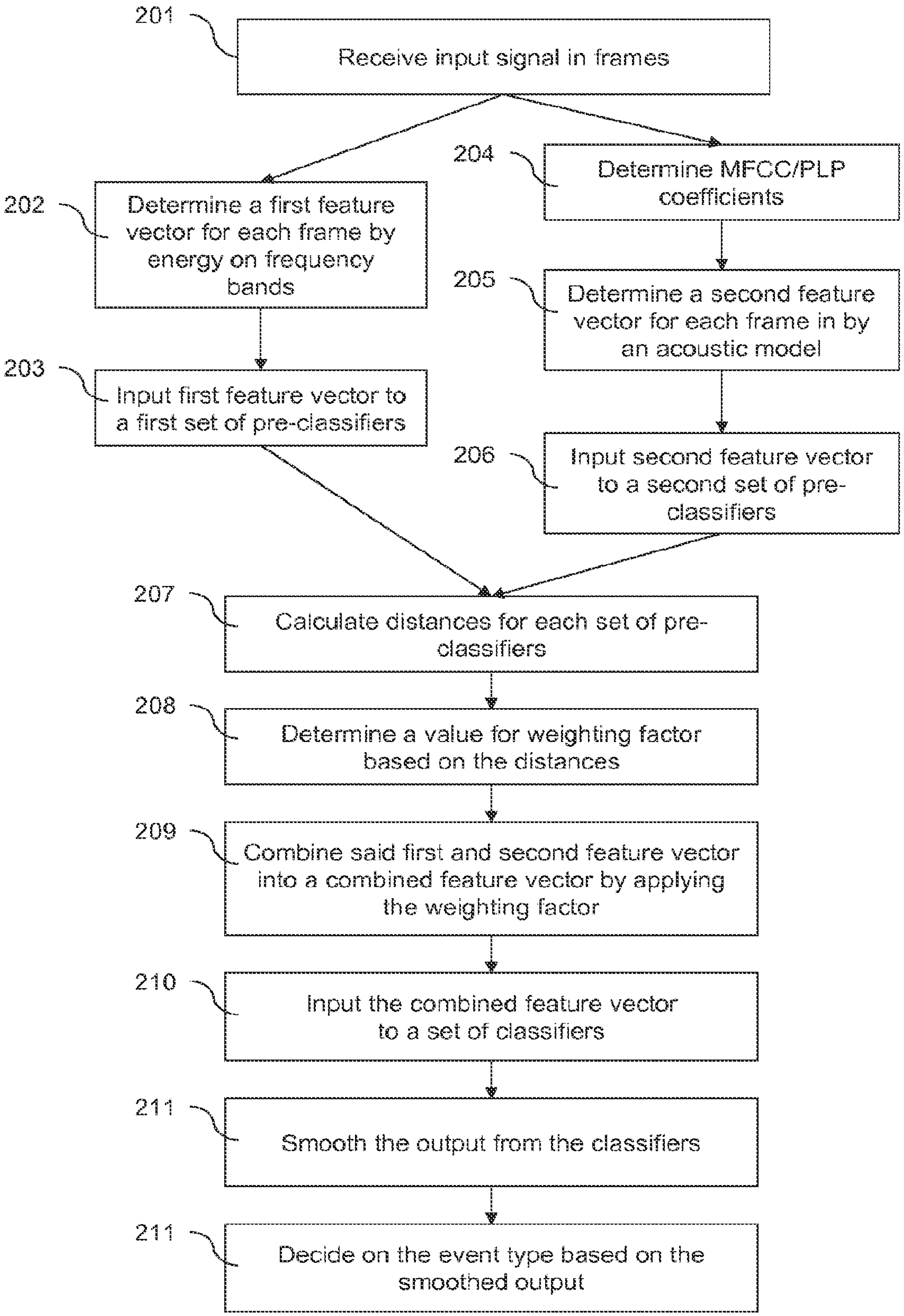
FIG. 2 shows, as an example, a flowchart of a voice activity detection method in accordance with an embodiment of the invention.

FIG. 1 shows schematically a voice activity detection system 100 in accordance with an embodiment of the invention. FIG. 2 shows a flowchart of the voice activity diction method 200.

It is appreciated that the order of the steps in the method 200 may be varied. Also the arrangement of blocks may be varied from that shown in FIG. 1, as long as the functionality provided by the block is present in the voice detection system 100.

The voice activity detection system 100 receives input data 101 (step 201). The input data is typically split into frames, which are overlapping consecutive segments of speech (input signal) of sizes varying between 10-30 ms (milliseconds). The signal energy block 104 determines for each frame a first feature vector, ($En_1$, $En_2$, $En_3$, . . . , $En_m$) (step 202). The front end 102 calculates typically for each frame MFCC coefficients and their derivatives, or perceptual linear predictive (PLP) coefficients (step 204). These coefficients are input to an acoustic model AM 103. In FIG. 1, the acoustic model is, by the way of example, shown to be a multilingual acoustic model. The acoustic model 103 provides phonetic acoustic likelihoods as a second feature vector for each frame (step 205). A multilingual acoustic model ensures the usage of a model dependent VAD at least for any of the language for which it has been trained.

The first feature vectors ($En_1$, $En_2$, $En_3$, . . . , $En_m$) provided by the energy band block 104 are input to a first set of pre-classifiers M3, M4 121, 122 (step 203). The second feature vectors (P1, P2) provided by the acoustic model 103 are input into a second set of pre-classifiers M1, M2 111, 112 (step 206). The pre-classifiers M1, M2, M3, M4 are typically Gaussian mixture pre-classifiers, outputting Gaussian mixture distributions. A neural network can be also used to provide the posterior probabilities of each of the classes. The number of pre-classifiers in these sets corresponds with the number of event classes the voice activity detection system 100 needs to detect. FIG. 1 shows the event classes speech/noise as an example. But depending on the application, there may be need for a larger number of event classes. The pre-classifiers have been trained for the respective event classes. In the example in FIG. 1, $M_1$ is the speech model trained only with ($P_1$, $P_2$), $M_2$ is the noise model trained only with ($P_1$, $P_2$), $M_3$ is the speech model trained only with ($En_1$, $En_2$, $En_3$, . . . , $En_m$), and $M_4$ is the noise model trained only with ($En_1$, $En_2$, $En_3$, . . . , $En_m$).

The voice activity detection system 100 calculates the distances between the distributions output by the preclassifiers in each set (step 207). In other words, a distance KL12 between the outputs of the pre-classifiers M1 and M2 is calculated and, similarly, a distance KL34 between the outputs of the pre-classifiers M3 and M4. If there are more than two classes of event types, distances can be calculated between all pairs of pre-classifiers in a set or, alternatively, only between some predetermined pairs of pre-classifiers. The distances may be, for example, Kullback-Leibler distances, Mahalanobis distances, or Euclidian distances. Typically same distance type is used for both sets of pre-classifiers.

The VAD system 100 combines the feature vectors ($P_1$, $P_2$) and ($En_1$, $En_2$, $En_3$, . . . , $En_m$) into a combined feature vector by applying a weighting factor k on the feature vectors (step 209). The combined feature vector can be, for example, of the following form:

$$(k*En_1k*En_2k*En_3 \ldots k*En_m(1-k)*P_1(1-k)*P_2).$$

A value for the weighting factor k is determined based on the distances KL12 and KL34 (step 208). One example of determined the value for the weighting factor k is the following. During the training phase, when the SNR of the training signal can be computed, a data structure is formed containing SNR class labels and corresponding KL12 and KL34 distances. Table 1 is an example of such a data structure.

TABLE 1

Look-up table for distance/SNR correspondence.

| SNR class for each frame | SNR value (dB) | $KL_{12L}$ | $KL_{12H}$ | $KL_{34L}$ | $KL_{34H}$ |
|---|---|---|---|---|---|
| Low | | $KL_{12L\text{-}frame\text{-}1}$ | | $KL_{34L\text{-}frame\text{-}1}$ | |
| Low | | $KL_{12L\text{-}frame\text{-}2}$ | | $KL_{34L\text{-}frame\text{-}2}$ | |
| Low | | $KL_{12L\text{-}frame\text{-}3}$ | | $KL_{34L\text{-}frame\text{-}3}$ | |
| . . . | . . . | . . . | . . . | . . . | |
| Low | | $KL_{12L\text{-}frame\text{-}n}$ | | $KL_{34L\text{-}frame\text{-}n}$ | |
| $THRESHOLD_1$ | | $TH_{12L}$ | $TH_{12H}$ | $TH_{34L}$ | $TH_{34H}$ |
| High | | | $KL_{12H\text{-}frame\text{-}n+1}$ | | $KL_{34H\text{-}frame\text{-}n+1}$ |
| High | | | $KL_{12H\text{-}frame\text{-}n+2}$ | | $KL_{34H\text{-}frame\text{-}n+2}$ |
| High | | | $KL_{12H\text{-}frame\text{-}n+3}$ | | $KL_{34H\text{-}frame\text{-}n+3}$ |
| . . . | . . . | . . . | . . . | . . . | . . . |
| High | | | $KL_{12H\text{-}frame\text{-}n+m}$ | | $KL_{34H\text{-}frame\text{-}n+m}$ |

As Table 1 shows, there may be threshold values that divide the SNR space into ranges. In Table 1, threshold value THRESHOLD1 divide the SNR space into two ranges: low SNR, and high SNR. The distance values KL12 and KL34 are used to predict the current environment type and are computed for each input speech frame (e.g. 10 ms).

In Table 1, there is one column for each SRN class and distance pair. In other words, in the specific example here, there are two columns (SNR high, SNR low) for distance KL12 and two columns (SNR high, SNR low) for distance KL34. As a further option to the format of Table 1, it is possible during the training phase to collect all distance values KL12 to one column and all distance values KL34 to a further column. It is possible to make the distinction between SNR low/high by the entries in the SNR class column.

Referring back to the training phase and Table 1, at the frame x if the environment is noisy (low SNR), only ($KL_{12L\text{-}frame\text{-}x}$ and $KL_{34L\text{-}frame\text{-}x}$) pair will be computed. At the next frame (x +1), if the environment is still noisy, ($KL_{12L\text{-}frame\text{-}x+1}$ and $KL_{34L\text{-}frame\text{-}x+1}$) pair will be computed; otherwise (high SNR) ($KL_{12H\text{-}frame\text{-}x+1}$ and $KL_{34H\text{-}frame\text{-}x+1}$) pair is computed. The environment type is computed at the training phase for each frame and the corresponding KL distances are collected into the look up table (Table I). At run time, when the information about the SNR is missing, for each speech frame one computes distance values KL12 and KL34. Based on comparison of KL12 and KL34 values against the corresponding threshold values in the look up table, one retrieves the information about SNR type. In this way the type of environment (SRN class) can be retrieved.

As a summary, the values in Table 1 or in a similar data structure are collected during the training phase, and the thresholds are determined during the training phase. In the run-time phase, when voice activity detection is carried out, the distance values KL12 and KL34 are compared to the thresholds in Table 1 (or in the similar data structure), and based on the comparison it is determined which SNR class describing the environment of the current frame.

After determining the current environment (SNR range), the value for the weighting factor can be determined based on the environment type, for example, based on the threshold values themselves using the following relations.

1. for $SNR<THRESHOLD_1$, $k=\min(TH_{12\text{-}L}, TH_{34\text{-}L})$
2. for $SNR>THRESHOLD_1$, $k=\max(TH_{12\text{-}H}, TH_{34\text{-}H})$ As an alternative to using the threshold values in the calculation of the weighting factor value, the distance values KL12 and KL34 can be used. For example, the value for k can be k=min(KL12, KL34), when SNR<THRESHOLD1, and k=max (KL12, KL34), when SNR>THRESHOLD1. This way the voice activity detection system is even more dynamic in taking into account changes in the environment.

The combined feature vector (Weighted FV*) is input to a set of classifiers 131, 132 (step 210), which have been trained for speech and noise. If there are more than two event types, the number of pre-classifier and classifiers in the set of classifiers acting on the combined feature vector will be in line with the number of event types. The set of classifiers for the combined feature vector typically uses heuristic decision rules, Gaussian mixture models, perceptron, support vector machine or other neural networks. The score provided by the classifiers 131 and 132 is typically smoothed over a couple of frames (step 211). The voice activity detection system then decides on the event type based on the smoothed scores (step 212).

Figure 3:
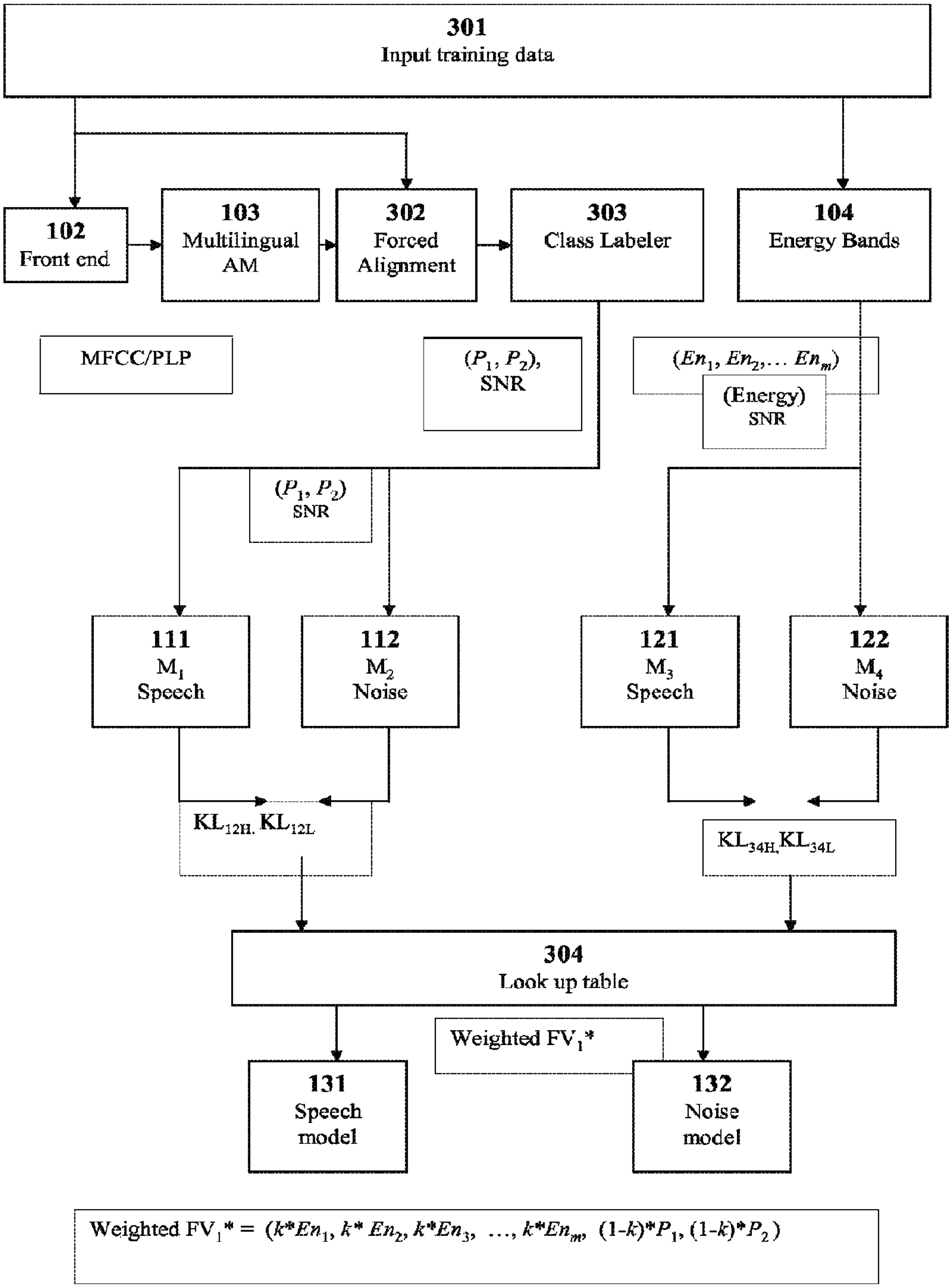
FIG. 3 shows schematically one example of training a voice activity detection system in accordance with an embodiment of the invention.

FIG. 3 shows schematically training of the voice activity detection system 100. Preferably, training of the voice activity detection system 100 occurs automatically, by inputting a training signal 301 and switching the system 100 into a training mode. The acoustic FVs computed for each frame in the front end 102 are input into the acoustic model 103 for two reasons: to label the data into speech/noise and to produce another type of FV which is more effective for discriminating speech from other noise. The latter reason applies also to the run-time phase of the VAD system.

The labels for each frame can be obtained from one of following methods: manually, by running a speech recognition system in a forced alignment mode (forced alignment block 302 in FIG. 3) or by using the output of an already existing speech decoder. For illustrative purposes, the second method of labeling the training data is discussed in more detail in the following, with reference to FIG. 3.

Consider "phone to class" mapping which takes place in block 303. The acoustic phonetic space for all languages in place is defined by mapping all of the phonemes from the inventory to the discriminative classes. We choose two classes (speech/noise) as an illustrative example, but the event classes and their number can be any depending on the needs imposed by the environment under which the voice activity detection intends to work. The phonetic transcription of the training data is necessary for this step. For instance, the pure silence phonemes, the unvoice fricatives and plosives are chosen for noise class while the rest of phonemes for speech class.

Consider next the class likelihood generation that occurs in the multilingual acoustic model block 103. Based on the outcome from the acoustic model 103 and on the acoustic feature (e.g MFCC coefficients input to the multilingual AM (block 103), the speech detection class posterior are derived by mapping the whole Gaussians of the AM into the corresponding phones and then to corresponding classes. For example, for class noise, all Gaussians belonging to noisy and silence classes are mapped in to noise; and the rest of the classes of mapped into the class speech.

Viterbi alignment occurs in the forced alignment block 302. Given the correct transcription of the signal, forced alignment determines the phonetic information for each signal segment (frame) using the same mechanism as for speech recognition. This aligns features to allophones (from AM). The phone to class mapping (block 303) then gives the mapping from allophones to phones and finally to class. The speech/noise labels from forced alignment are treated as correct label.

The Gaussian models (blocks 111, 112) for the defined classes irrespective of the language can then be trained.

So, for each input frame, based on the MFCC coefficients, the second feature vectors (P1, P2) are computed by multilingual acoustic model in block 103 and aligned to the corresponding class by block 302 and 303. Moreover, the SNR is also computed at this stage. The block 302 outputs the second feature vectors together with the SNR information to the second set of pre-classifiers 111, 112 that are pre-trained Speech/noise Gaussian Mixtures.

The voice activity detection system 100 inputs the training signal 301 also to the energy bands block 104, which determines the energy of the signal in different frequency bands. The energy bands block 104 inputs the first feature vectors to the first set of pre-classifiers 121,122 which have been previously trained for the relevant event types.

The voice activity detection system 100 in the training phase calculates the distance KL12 between the outputs of the preclassifiers 111, 112 and the distance KL34 between the outputs of the pre-classifiers 121, 122. Information about the SNR is passed along with the distances KL12 and KL34. The voice activity detection system 100 generates a data structure, for example a lookup table, based on the distances KL12, KL34 between the outputs of the pre-classifiers and the SNR.

The data structure typically has various environment types, and values of the distances KL12, KL34 associated with these environment types. As an example, Table 1 contains two environment types (SNR low, and SNR high). Thresholds are determined at the training phase to separate these environment types. During the training phase, distances KL12 and KL34 are collected into columns of Table 1, according to the SNR associated with each KL12, KL34 value. This way, the columns KL12*l*, KL12*h*, KL34*l*, and KL34*h* are formed.

The voice activity detection system 100 determines the combined feature vector by applying the weighting factor to the first and second feature vectors as discussed above. The combined feature vector is input to the set of classifiers 131, 132.

As mentioned above, it is possible to have more than two SNR classes. Also in this case, thresholds are determined during the training phase to distinguish the SNR classes from one another. Table 2 shows an example, where two event classes and three SNR classes are used. In this example there are two SNR thresholds ($THRESHOLD_1$, $THRESHOLD_2$) and 8 thresholds for the distance values. Below is an example of a formula for determining values for the weighting factor in this example.

1. for $SNR<THRESHOLD_1$, $k=\min(TH_{12\text{-}L}, TH_{34\text{-}L})$
2. for $THRESHOLD_1<SNR<THRESHOLD_2$ $$k=\begin{cases}\dfrac{TH_{12\_LM}+TH_{12\_MB}+TH_{34\_LM}+TH_{34\_MB}}{4}, \text{ if } \dfrac{TH_{12\_LM}+TH_{12\_MB}+TH_{34\_LM}+TH_{34\_MB}}{4}<0.5\\ 1-\dfrac{TH_{12\_LM}+TH_{12\_MB}+TH_{34\_LM}+TH_{34\_MB}}{4}, \text{ if } \dfrac{TH_{12\_LM}+TH_{12\_MB}+TH_{34\_LM}+TH_{34\_MB}}{4}>0.5\end{cases}$$

3. for $SNR>THRESHOLD_2$, $k=\max(TH_{12\text{-}H}, TH_{34\text{-}H})$

TABLE 2

A further example for a look-up table for distance/SNR correspondence.

| SNR class | SNR value (dB) | $KL_{12low}$ | $KL_{12med}$ | $KL_{12hi}$ | $KL_{34low}$ | $KL_{34med}$ | $KL_{34hi}$ |
|---|---|---|---|---|---|---|---|
| Low<br>. . . | | | | | | | |
| $THRESHOLD_1$<br>Medium<br>. . . | | $TH_{12}$_L | $TH_{12}$_LM | | $TH_{34}$_L | $TH_{34}$_LM | |
| $THRESHOLD_2$<br>High<br>. . . | | | $TH_{12}$_MH | $TH_{12}$_H | | $TH_{34}$_MH | $TH_{34}$_H |

Figure 4:
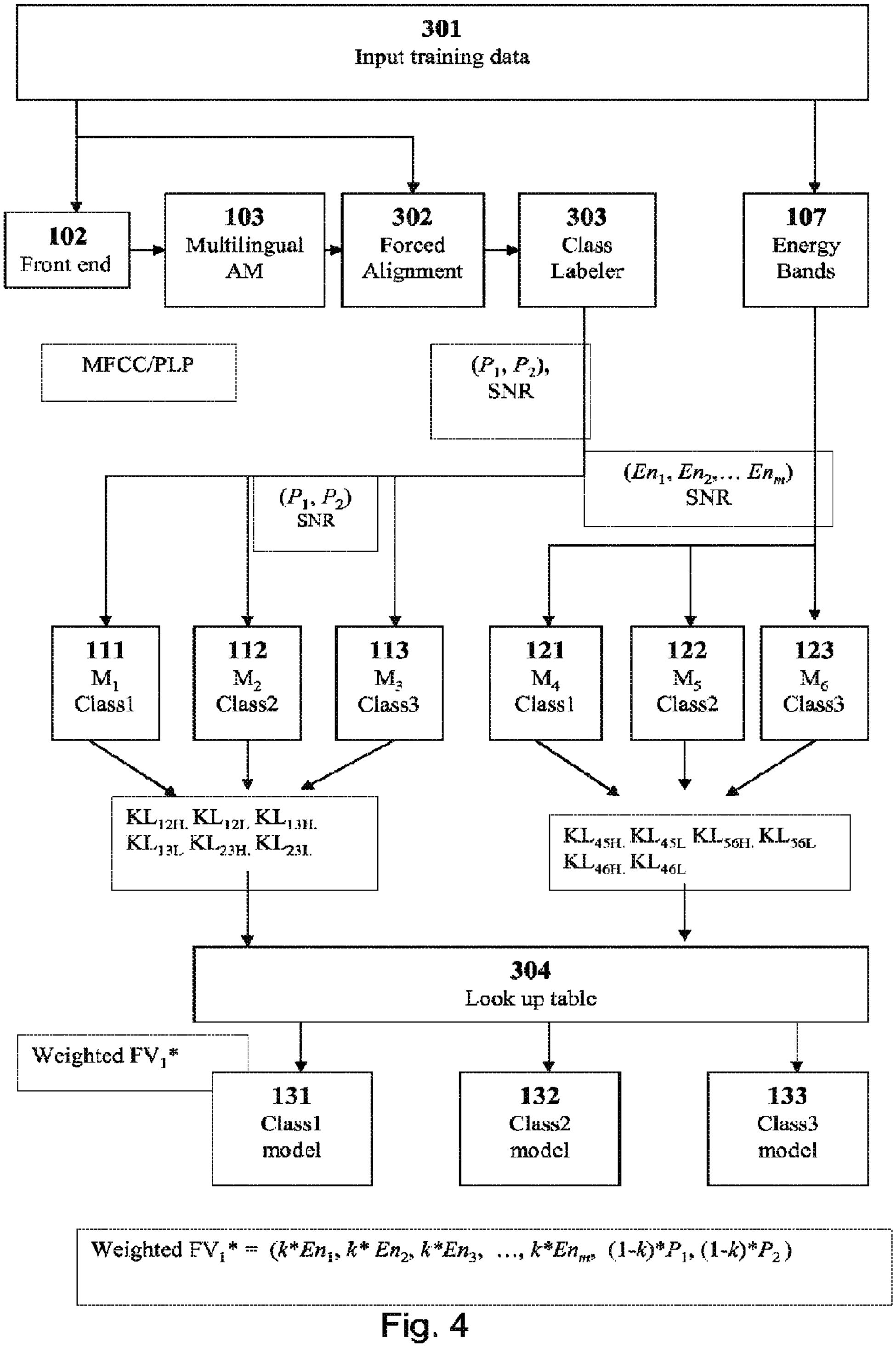
FIG. 4 shows schematically a further example of training a voice activity detection system in accordance with an embodiment of the invention.

It is furthermore possible to have more than two event classes. In this case there are more pre-classifiers and classifiers in the voice activity detection system. For example, for three event classes (speech, noise, silence), three distances are considered: KL(speech, noise), KL(speech, silence) and KL(noise, silence). FIG. 4 shows, as an example, training phase of a voice activity detection system, here there are three event classes and two SNR classes (environments type). There are three pre-classifiers (that is, the number of the event classes) for each feature vector type, namely models 111,112, 113 and models 121, 122, 123. In FIG. 4, the number of distances monitored during the training phase is 6 for each feature vector type, for example $KL_{12H}$, $KL_{12L}$, $KL_{13H}$, $KL_{13L}$, $KL_{23H}$, $KL_{23L}$ for the feature vector obtained from the acoustic model. The weight factor between the FVs depends on the SNR and FV's type. Therefore, if the number of defined SNR classes and the number of feature vectors remains unchanged, the procedure of weighting remains also unchanged. If the third SNR class is medium, a maximum value of 0.5 for the energy type FV is recommended but depending on the application it might be slightly adjusted.

It is furthermore feasible to have more than two feature vectors for a frame. The final weighted FV be of the form:

$$(k_1{*}FV1, k_2{*}FV2, k_3{*}FV3, \ldots k_n{*}FVn), \text{ where } k1+k2+k3+\ldots+kn=1.$$

What needs to be taken into account by using more FVs is their behavior with respect to different SNR classes. So, the number of SNR classes could influence the choice of FV. One FV for one class may be ideal. Currently, however, there is no such fine classification in the area of voice activity detection.

According to an aspect of the present invention there is provided a computerized method for discriminating between at least two classes of events, the method comprising receiving a set of frames containing an input signal; determining at least two different feature vectors for each of the frames; classifying the at least two different feature vectors using respective sets of preclassifiers trained for the at least two classes of events; determining values for at least one weighting factor based on outputs of the preclassifiers for each of the frames; calculating a combined feature vector for each of the frames by applying the at least one weighting factor to the at least two different feature vectors; and classifying the combined feature vector using a set of classifiers trained for the at least two classes of events.

The computerised method may comprise determining at least one distance between outputs of each of the sets of preclassifiers, and determining values for the at least one weighting factor based on the at least one distance. The method may further comprise comparing the at least one distance to at least one predefined threshold, and calculating values for the at least one weighting factor using a formula dependent on the comparison. The formula may use at least one of the at least one threshold values as input. The at least one distance may be based on at least one of the following: Kullback-Leibler distance, Mahalanobis distance, and Euclidian distance.

An energy-based feature vector may be determined for each of the frames. The energy-based feature vector may be based on at least one of the following: energy in different frequency bands, log energy, and speech energy contour.

A model-based feature vector may be determined for each of the frames. The model-based technique may be based on at least one of the following: an acoustic model, neural networks, and hybrid neural networks and hidden Markow model scheme.

In an embodiment, a first feature vector based on energy in different frequency bands and a second feature vector based on an acoustic model is determined for each of the frames. The acoustic model in this specific embodiment may be one of the following: a monolingual acoustic model, and a multilingual acoustic model.

Another aspect provides a computerized method for training a voice activity detection system, comprising receiving a set of frames containing a training signal; determining quality factor for each of the frames; labeling the frames into at least two classes of events based on the content of the training signal; determining at least two different feature vectors for each of the frames; training respective sets of preclassifiers to classify the at least two different feature vectors using for the at least two classes of events; determining values for at least one weighting factor based on outputs of the preclassifiers for each of the frames; calculating a combined feature vector for each of the frames by applying the at least one weighting factor to the at least two different feature vectors, and classifying the combined feature vector using a set of classifiers to classify the combined feature vector into the at least two classes of events.

The method may comprise determining thresholds for distances between outputs of the preclassifiers for determining values for the at least one weighting factor.

Yet another aspect of the invention provides a voice activity detection system for discriminating between at least two classes of events, the system comprising feature vector units for determining at least two different feature vectors for each frame of a set of frames containing an input signal; sets of preclassifiers trained for the at least two classes of events for classifying the at least two different feature vectors; a weighting factor value calculator for determining values for at least one weighting factor based on outputs of the preclassifiers for each of the frames; a combined feature vector calculator for calculating a value for the combined feature vector for each of the frames by applying the at least one weighting factor to the at least two different feature vectors; and a set of classifiers trained for the at least two classes of events for classifying the combined feature vector.

In the voice activity detection system, the weighting factor value calculator may comprise thresholds for distances between outputs of the preclassifiers for determining values for the at least one weighting factor.

A further aspect of the invention provides a computer program product comprising a computer-usable medium and a computer readable program, wherein the computer readable program when executed on a data processing system causes the data processing system to carry out that as described above.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is appreciated that although embodiments of the invention have been discussed on the assumption that the values for the dynamic weighting coefficient are updated for each frame, this is not obligatory. It is possible to determine values for the weighting factor, for example, in every third frame. The "set of frames" in the appended claims does not necessarily need to refer to a set of frames strictly subsequent to each other. The weighting can be done for more than one frame without losing the precision of class separation. Updating the weighting factor values less often may reduce the accuracy of the voice activity detection, but depending on the application, the accuracy may still be sufficient.

It is appreciated that although in the above description signal to noise ratio has been used as a quality factor reflecting the environment associated with the input signal, other quality factors may additionally or alternatively be applicable.

This description explicitly describes some combinations of the various features discussed herein. It is appreciated that various other combinations are evident to a skilled person studying this description.

In the appended claims a computerized method refers to a method whose steps are performed by a computing system containing a suitable combination of one or more processors, memory means and storage means.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for discriminating between at least two classes of events, the method comprising:

receiving a set of frames including an input signal;

determining at least two different feature vectors for each of the frames, wherein a first feature vector of the at least two different feature vectors is based on energy in different frequency bands, and a second feature vector of the at least two different feature vectors is based on an acoustic model;

preclassifying the at least two different feature vectors using respective sets of preclassifiers trained for the at least two classes of events, wherein the preclassifying occurs separately from a training of the sets of preclassifiers;

determining at least one distance between outputs of each of the sets of preclassifiers;

comparing the at least one distance to at least one predefined threshold, wherein the comparing occurs after determining at least one distance between outputs of each of the sets of preclassifiers is performed;

determining values for at least one weighting factor based on the at least one distance, using a formula dependent on the comparison;

calculating a combined feature vector for each of the frames by applying the at least one weighting factor to the at least two different feature vectors; and classifying the combined feature vector using a set of classifiers trained for the at least two classes of events.

2. The method of claim 1 wherein the formula uses at least one of the at least one threshold values as input.

3. The method of claim 1 wherein the at least one distance is based on at least one of the following: Kullback-Leibler distance, Mahalanobis distance, and Euclidian distance.

4. The method of claim 1 wherein the feature vector based on energy in different frequency bands is further based on at least one of the following: log energy and speech energy contour.

5. The method of claim 1 wherein the acoustic model-based technique is further based on at least one of the following: neural networks, and hybrid neural networks and hidden Markov model scheme.

6. The method of claim 1 wherein the acoustic model is one of the following: a monolingual acoustic model, and a multilingual acoustic model.

7. The method of claim 1, wherein:

the set of preclassifiers associated with a first feature vector of the at least two different feature vectors is trained only with a sample feature vector with a feature vector type identical to a feature vector type of the first feature vector; and the set of preclassifiers associated with a second feature vector of the at least two different feature vectors is trained only with a sample feature vector with a feature vector type identical to a feature vector type of the second feature vector.

8. The method of claim 1, wherein:

determining at least two different feature vectors for each of the frames further includes determining at least three different feature vectors for each of the frames; and determining at least one distance between each of the sets of preclassifiers further includes determining distances between outputs of a predetermined subset of pairs of preclassifiers.

9. The method of claim 1, wherein determining values for at least one weighting factor further includes determining a first weighting factor and a second weighting factor, wherein the first weighting factor is the predefined threshold and the second weighting factor is the binomial complement of the predefined threshold.

10. The method of claim 1, wherein determining values for at least one weighting factor further includes determining a first weighting factor and a second weighting factor, wherein the first weighting factor is one of the calculated distances and the second weighting factor is the binomial complement of the one of the calculated distances.

11. A method for training a voice activity detection system, comprising:

receiving a set of frames including a training signal;

determining a quality factor for each of the frames;

labeling the frames into at least two classes of events based on the content of the training signal;

determining at least two different feature vectors for each of the frames, wherein a first feature vector of the at least two different feature vectors is based on energy in different frequency bands, and a second feature vector of the at least two different feature vectors is based on an acoustic model;

training respective sets of preclassifiers to classify the at least two different feature vectors using for the at least two classes of events;

determining at least one distance between outputs of each of the sets of preclassifiers;

comparing the at least one distance to at least one predefined threshold, wherein the comparing occurs after determining at least one distance between outputs of each of the sets of preclassifiers is performed;

determining values for at least one weighting factor based on the at least one distance, using a formula dependent on the comparison;

calculating a combined feature vector for each of the frames by applying the at least one weighting factor to the at least two different feature vectors; and classifying the combined feature vector using a set of classifiers to classify the combined feature vector into the at least two classes of events.

12. The method of claim 11, further comprising determining thresholds for distances between outputs of the preclassifiers for determining values for the at least one weighting factor.

13. A computer-readable storage device with an executable program stored thereon, wherein the program instructs a processor to perform:

receiving a set of frames including an input signal;

determining at least two different feature vectors for each of the frames, wherein a first feature vector of the at least two different feature vectors is based on energy in different frequency bands, and a second feature vector of the at least two different feature vectors is based on an acoustic model;

preclassifying the at least two different feature vectors using respective sets of preclassifiers trained for the at least two classes of events, wherein the reclassifying occurs separately from a training of the sets of preclassifiers;

determining at least one distance between outputs of each of the sets of preclassifiers;

comparing the at least one distance to at least one predefined threshold, wherein the comparing occurs after determining at least one distance between outputs of each of the sets of preclassifiers is performed;

determining values for at least one weighting factor based on the at least one distance, using a formula dependent on the comparison;

calculating a combined feature vector for each of the frames by applying the at least one weighting factor to the at least two different feature vectors; and classifying the combined feature vector using a set of classifiers trained for the at least two classes of events.

14. The computer-readable storage device of claim 13 wherein the formula uses at least one of the at least one threshold values as input.

15. The computer-readable storage device of claim 13 wherein the at least one distance is based on at least one of the following: Kullback-Leibler distance, Mahalanobis distance, and Euclidian distance.

* * * * *